(12) United States Patent
Dietz et al.

(10) Patent No.: US 6,568,366 B2
(45) Date of Patent: May 27, 2003

(54) INTAKE DEVICE FOR AN INTERNAL COMBUSTION ENGINE

(75) Inventors: Armin Dietz, Wenzenbach (DE); Peter Fischer, Nittendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/082,293

(22) Filed: Feb. 25, 2002

(65) Prior Publication Data

US 2002/0108601 A1 Aug. 15, 2002

Related U.S. Application Data

(63) Continuation of application No. PCT/DE00/02826, filed on Aug. 18, 2000.

(30) Foreign Application Priority Data

Aug. 24, 1999 (DE) .......................................... 199 40 053

(51) Int. Cl.$^7$ ................................................ F02B 31/00
(52) U.S. Cl. .................. 123/308; 123/432; 123/184.21; 123/184.61

(58) Field of Search ................................. 123/432, 308, 123/184.21, 184.61, 184.47

(56) References Cited

U.S. PATENT DOCUMENTS

| 4,972,814 A | * | 11/1990 | Matsuki et al. ............... 123/308 |
| 5,696,318 A | * | 12/1997 | Ernst et al. .................. 123/432 |
| 5,806,484 A | * | 9/1998 | Yoneyama et al. ......... 123/308 |
| 5,896,838 A | * | 4/1999 | Pontopiddan et al. .. 123/184.47 |
| 6,055,958 A | * | 5/2000 | Aoyama et al. ............ 123/308 |

* cited by examiner

*Primary Examiner*—Marguerite McMahon
(74) *Attorney, Agent, or Firm*—Laurence A. Greenberg; Werner H. Stemer; Ralph E. Locher

(57) ABSTRACT

An intake device has a flange, at which it can be attached to a flange of a cylinder head. Intake pipes are furthermore provided, which are configured as at least two inlet ducts per cylinder. At least in the region of the flange of the intake device, the free cross section of at least one of the intake ducts in each case is capable of being closed by a flap. The flange and the flap with a shaft and a bearing are formed in such a way that the flap can be introduced with the shaft and the bearing in front of that side of the flange that faces the cylinder head.

9 Claims, 3 Drawing Sheets

INTAKE DEVICE FOR AN INTERNAL COMBUSTION ENGINE

CROSS-REFERENCE TO RELATED APPLICATION

This application is a continuation of copending International Application No. PCT/DE00/02826, filed Aug. 18, 2000, which designated the United States.

BACKGROUND OF THE INVENTION

Field of the Invention

The invention relates to an intake device for an internal combustion engine. The intake device has a flange, at which the intake device can be attached to a flange of the cylinder head. The intake device further has intake pipes, which are configured as at least two inlet ducts per cylinder. At least in the region of the flange of the intake device, the free cross section of at least one of the intake ducts in each case is capable of being closed by a flap. The flange and the flap with a shaft and a bearing being formed in such a way that the flap can be introduced with the shaft and the bearing from that side of the flange that faces the cylinder head.

German Patent DE 196 22 891 C2 discloses an intake device for an internal combustion engine, which has a flange at which the intake device can be attached to a flange of the cylinder head. The intake device is furthermore assigned intake pipes, which are configured as two intake ducts per cylinder, the free cross section of one of the intake ducts in each case is capable of being closed by a flap. A shaft is introduced into the respective intake duct by a hole. The switching flap is attached to the shaft by fastening elements. Production of the known intake device is extremely involved and hence costly since a special hole has to be provided for the shaft, the shaft must be introduced into the hole without the flap, and the flap must then be mounted on the shaft.

Published, Non-Prosecuted German Patent Application DE 195 04 832 A1 discloses an intake device for an internal combustion engine, having a flange at which the intake device can be attached to a flange of the cylinder head. The intake device has intake pipes that are configured as at least two intake ducts per cylinder. At least in the region of the flange of the intake device, the free cross section of at least one of the intake ducts in each case is capable of being closed by a flap. The flap configuration is supported on the flange side of the intake system by a bearing frame. As an alternative, the flap configuration is attached to the intake system by snap-action elements. A seal is provided to seal off the intake system with respect to the engine block.

SUMMARY OF THE INVENTION

It is accordingly an object of the invention to provide an intake device for an internal combustion engine which overcomes the above-mentioned disadvantages of the prior art devices of this general type, in which the intake device has a simplified configuration.

With the foregoing and other objects in view there is provided, in accordance with the invention, an intake device provided in combination with an internal combustion engine having a cylinder head with a cylinder flange. The intake device contains a flange attached to the cylinder flange of the cylinder head, and a flap assembly having a flap, a shaft and a bearing. The flap assembly is disposed in the flange. The intake device further has intake pipes extending to the flange. Each of the intake pipes has at least two inlet ducts per cylinder. At least in a region of the flange a free cross section of at least one of the intake ducts is capable of being closed by the flap. The flange and the flap with the shaft and the bearing are formed such that the flap can be introduced with the shaft and the bearing from a side of the flange that faces the cylinder head. A seal is disposed and formed between the flange and the cylinder flange such that the inlet ducts are sealed off with respect to surroundings in a region of the flange and the cylinder flange, and the shaft is simultaneously sealed off with respect to the surroundings.

The invention is distinguished by the fact that the flap can be introduced with the shaft and the bearing from that side of the flange of the intake device that faces the cylinder head of the internal combustion engine. The shaft, the bearings and the flap can thus be preassembled even before introduction into the intake device and it is thus advantageously possible for the flap to be formed simply by molding plastic around the shaft.

In accordance with an added feature of the invention, the flange has a groove and the seal is disposed in the groove. The groove is formed on the side of the flange facing the cylinder head and surrounds the free cross section of the at least one of the inlet ducts on the side of the flange facing the cylinder head.

In accordance with an additional feature of the invention, the bearing is one of a plurality of bearings, and the groove has regions in which the bearings are disposed.

In accordance with another feature of the invention, the flap assembly is one of a plurality of flap assemblies. A coupling mechanism is connected to the shaft of each of the flap assemblies, and a switching device is connected to the coupling mechanism and is coupled to the shaft of the flap assemblies through the coupling mechanism.

In accordance with a further feature of the invention, the flap is formed by molding plastic around the shaft.

In accordance another added feature of the invention, the bearing is one of a plurality of bearings formed from plastic.

In accordance with another additional feature of the invention, the seal is formed from a sealing compound molded around the bearings.

In accordance with a concomitant feature of the invention, the inlet ducts are configured to produce a swirling flow in cylinders of the internal combustion engine.

Other features which are considered as characteristic for the invention are set forth in the appended claims.

Although the invention is illustrated and described herein as embodied in an intake device for an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
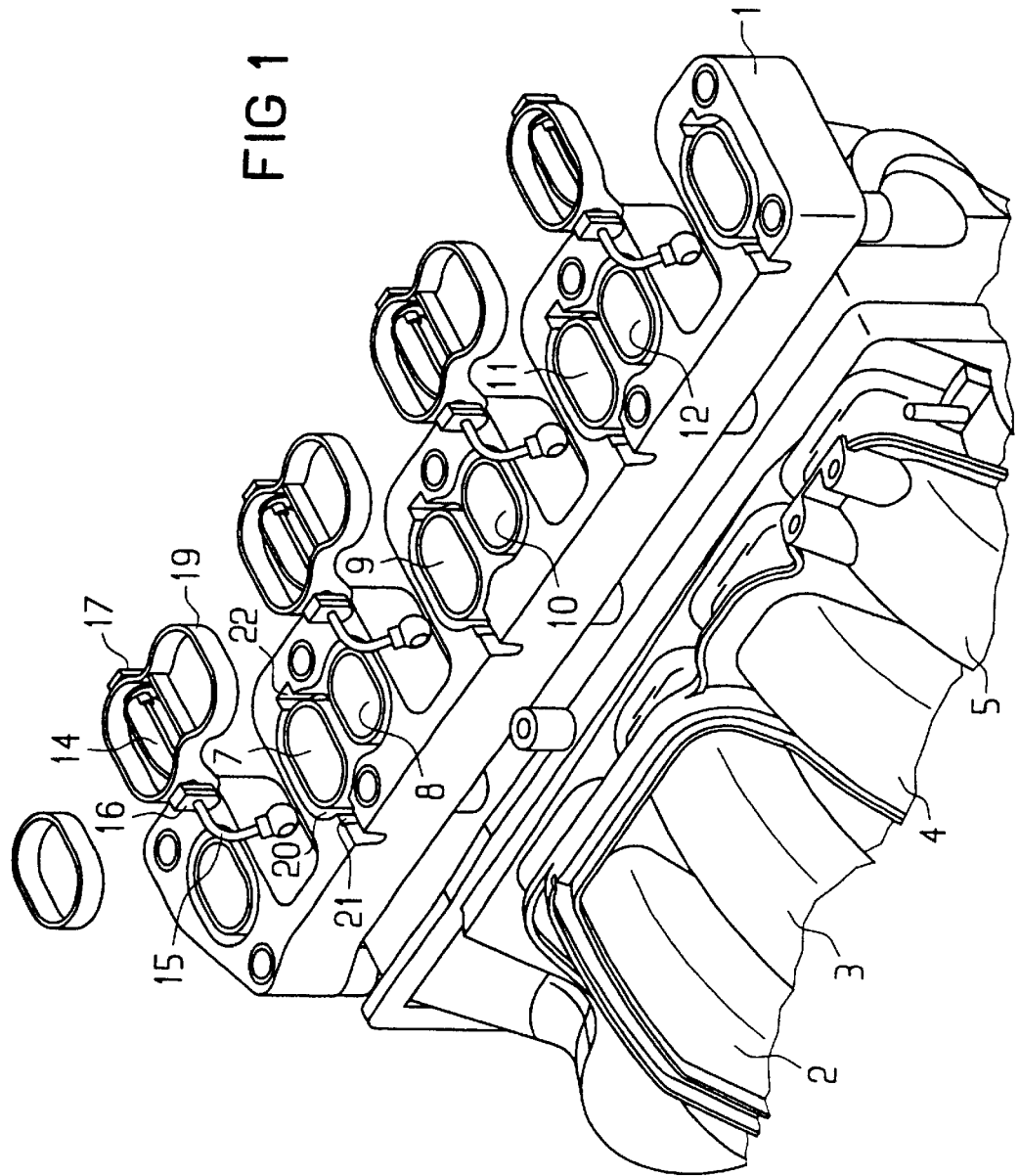
FIG. 1 is a diagrammatic, exploded, perspective view of an intake device according to the invention.
Figure 2:
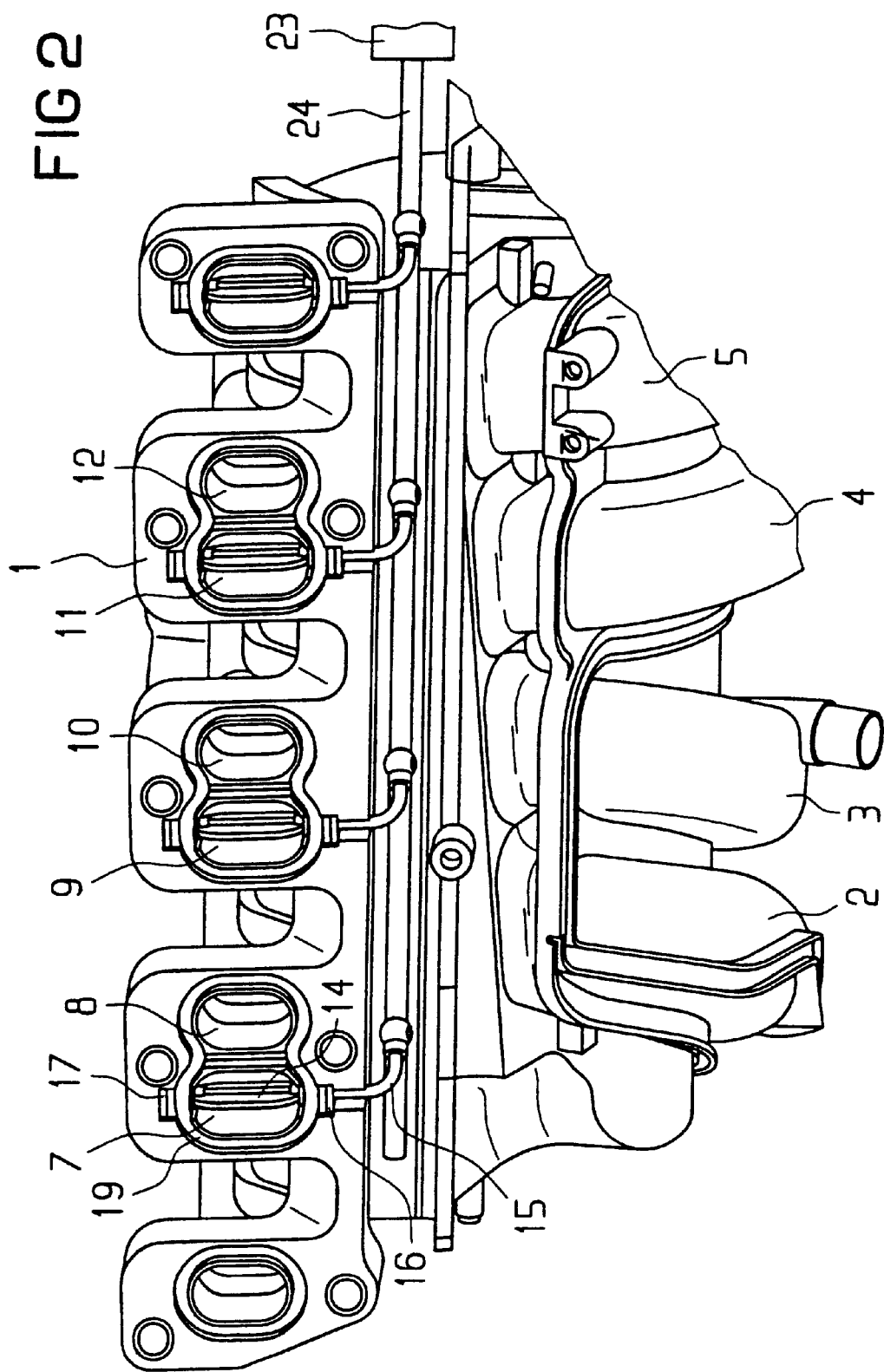
FIG. 2 is another perspective view of the intake device.

Referring now to the figures of the drawing in detail and first, particularly, to FIG. 1 thereof, there is shown an intake device for an internal combustion engine and has a flange 1 and intake pipes 2, 3, 4, 5. The intake pipes 2 to 5 extend from a non-illustrated manifold toward the flange 1, each forming two inlet ducts 7, 8; 9, 10; 11, 12 on the way from the manifold to the flange 1. Respective flaps 14 are disposed in such a way in one of each pair of inlet ducts 7, 9, 11 emerging from each intake pipe 2 to 5 that the free cross section of the respective inlet duct 7, 9, 11 can be closed by the flap 14.

Figure 3:
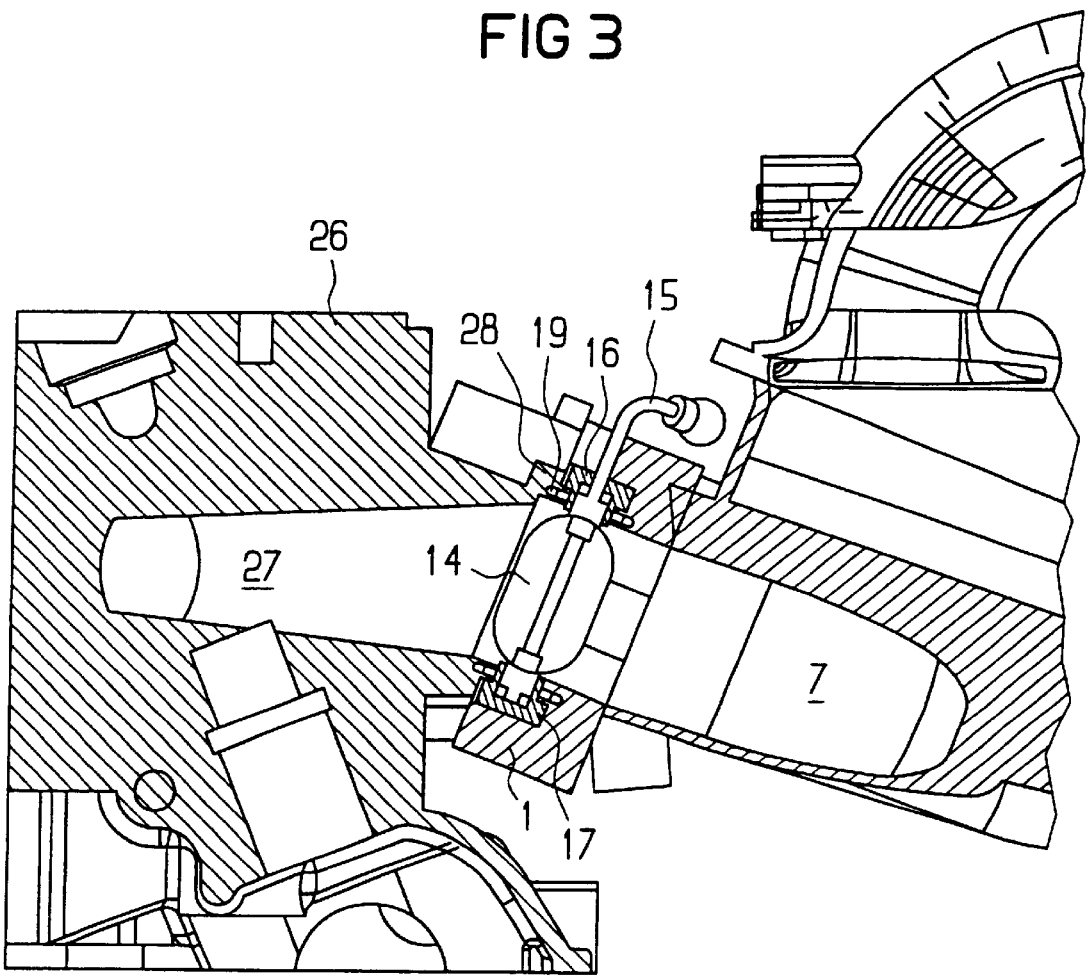
FIG. 3 is a sectional view through part of the intake device after being mounted on a cylinder head.

The flange 1 of the intake device can be attached to a flange 28 of a cylinder head 26 by fastening elements (FIG. 3). Another inlet duct 27 is formed in the cylinder head 26, more specifically in such a way that, when the intake device is flanged on, the air can flow from the inlet duct 7 into the other inlet duct 27 and from there into a non-illustrated cylinder.

A shaft 15 is provided, on which the flap 14 is disposed. The flap 14 is preferably formed by simply molding plastic around the shaft 15. Molding plastic around the shaft 15 is extremely economical. Also provided on the shaft 15 are bearings 16 and 17, which are likewise preferably formed from plastic. A seal 19 is furthermore provided, surrounding the free cross section of at least one inlet duct 7, 8; 9, 10; 11, 12 on that side of the flange 1 of the intake device that faces the cylinder head 26.

In the preferred exemplary embodiment, the seal 19 is formed in one piece for each pair of inlet ducts 7, 8; 9, 10; 11, 12. The seal 19 is disposed and formed in such a way between the two flanges 1, 28 that the inlet ducts 7, 14, 8 are sealed off with respect to the surroundings in the region of the flanges and at the same time the bearings 16, 17 are sealed off with respect to the surroundings. In this context, the word "surroundings" is used for the area surrounding the intake device and the cylinder head 26.

The seal 19 is disposed in a groove 20, which is formed in the flange 1 of the intake device on the side of the flange 1 associated with the cylinder head 26 and which surrounds the free cross section of one inlet duct 7, 8, 9, 10, 11, 12 in each case. The groove 20 is preferably configured in such a way that it also additionally surrounds the free cross section of a second inlet duct in each case.

Regions 21, 22 for the introduction of the bearings 16, 17 are furthermore formed in the groove 20. The sealing compound from which the seal 19 is formed is molded around the bearings 16, 17. The shaft 15, the bearings 16, 17, the flap 14 and the seal 19 can thus be preassembled even before introduction into the intake device.

The bearings 16, 17 and the seal 19 and the flap 14 and the shaft 15 are introduced into the groove 20 from that side of the flange of the intake device that faces the cylinder head 26. When the flange 1 of the intake device is attached to the flange 28 of the cylinder head 26, the seal 19 and the bearings 16, 17 are compressed. On the one hand, this has the advantage both that the inlet ducts are guided in a sealed manner through the flange 1, 28 and, on the other hand, that the bearings 16, 17 of the flaps 14 are also sealed off from the surroundings. It is furthermore possible to omit bearing covers for the bearings 16, 17 since the flange 28 of the cylinder head acts as a bearing cover.

The intake device furthermore contains a switching device 23, which is coupled mechanically to the shafts 15 of the flaps 14 via a coupling mechanism 24 and by which the flaps 14 can be actuated. A swirling flow of the type that is advantageous especially in internal combustion engines featuring direct injection of the fuel can be produced in the non-illustrated cylinders of the internal combustion engine as a function of the respective position of the flaps 14.

The bearings 16, 17 are preferably also formed from plastic and thus help to reduce the weight of the intake device. The seal is preferably formed from an elastomer, especially an NBR material (acrylonitrile-wutadiene rubber).

The invention is not limited to the exemplary embodiment described. For example, it is also possible for more than two inlet ducts to be provided per cylinder or for flaps to be disposed in more than one of the inlet ducts associated with each cylinder.

We claim:

1. In combination with an internal combustion engine having a cylinder head with a cylinder flange, an intake device comprising:
   a flange to be attached to the cylinder flange of the cylinder head;
   a flap assembly having a flap, a shaft and a bearing, said flap assembly disposed in said flange;
   intake pipes extending to said flange, each of said intake pipes having at least two inlet ducts per cylinder, at least in a region of said flange a free cross section of at least one of said inlet ducts being capable of being closed by said flap, said flange and said flap with said shaft and said bearing being formed such that said flap can be introduced with said shaft and said bearing from a side of said flange that faces the cylinder head; and
   a single seal for each said at least two inlet ducts disposed and formed between said flange and the cylinder flange such that said inlet ducts are sealed off with respect to surroundings in a region of said flange and the cylinder flange, and said shaft is sealed off in a region of said bearing with respect to the surroundings.

2. The intake device according to claim 1, wherein said flange has a groove formed therein and said seal is disposed in said groove, said groove is formed on said side of said flange facing the cylinder head and surrounds said free cross section of said at least one of said inlet ducts on said side of said flange facing the cylinder head.

3. The intake device according to claim 2, wherein said bearing is one of a plurality of bearings, and said groove has regions in which said bearings are disposed.

4. The intake device according to claim 1,
   wherein said flap assembly is one of a plurality of flap assemblies;
   including a coupling mechanism connected to said shaft of each of said flap assemblies; and
   including a switching device connected to said coupling mechanism and coupled to said shaft of said flap assemblies through said coupling mechanism.

5. The intake device according to claim 1, wherein said flap is formed by molding plastic around said shaft.

6. The intake device according to claim 1, wherein said bearing is one of a plurality of bearings formed from plastic.

7. The intake device according to claim 6, wherein said seal is formed from a sealing compound molded around said bearings.

8. The intake device according to claim 1, wherein said inlet ducts are configured to produce a swirling flow in cylinders of the internal combustion engine.

9. In combination with an internal combustion engine having a cylinder head with a cylinder flange, an intake device comprising:

a flange attached to the cylinder flange of the cylinder head;

flap assemblies each having a flap, a shaft, a bearing, and a single seal, said flap assemblies disposed in said flange, and intake pipes extending to said flange, each of said intake pipes having at least two inlet ducts per cylinder, at least in a region of said flange a free cross section of at least one of said two inlet ducts in each case being capable of being closed by said flap of one of said flap assemblies, said flange and said flap with said shaft and said bearing being formed such that said flap can be introduced with said shaft and said bearing from a side of said flange that faces the cylinder head, said single seal disposed between said flange and the cylinder flange to commonly seal each said at least two inlet ducts per cylinder and seal said inlet ducts with respect to surroundings in a region of said flange and the cylinder flange, and sealing said shaft off with respect to the surroundings.

* * * * *